Figure 1:
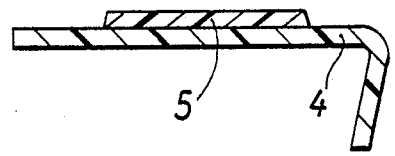

United States Patent [19]

Davis

[11] Patent Number: 4,840,824
[45] Date of Patent: Jun. 20, 1989

[54] STAIRTREAD FACINGS AND A CO-EXTRUSION METHOD FOR THEIR MANUFACTURE

[75] Inventor: Robert J. Davis, Stockport, United Kingdom

[73] Assignee: Ferodo, Inc., Manchester, England

[21] Appl. No.: 111,583

[22] Filed: Oct. 13, 1987

[30] Foreign Application Priority Data

Oct. 14, 1986 [GB] United Kingdom ................ 8624653

[51] Int. Cl.⁴ .......................... B32B 3/10; B32B 5/20;
B29C 67/22; B29C 47/06
[52] U.S. Cl. ........................................ 428/67; 52/179;
52/181; 264/45.9; 264/171; 428/156; 428/157;
428/159; 428/319.7; D25/69
[58] Field of Search ...................... 264/45.9, 46.1, 171;
52/179, 181; 428/67, 156, 157, 159, 319.7

[56] References Cited

U.S. PATENT DOCUMENTS

| | | | |
|---|---|---|---|
| 3,068,136 | 12/1962 | Reid | 264/46.1 X |
| 3,565,737 | 2/1971 | Lefevre et al. | 428/67 X |
| 4,151,320 | 4/1979 | Naka | 52/179 X |
| 4,321,294 | 3/1982 | Naka | 52/179 X |
| 4,381,273 | 4/1983 | Azzola | 264/45.9 |
| 4,476,174 | 10/1984 | Carrera | 428/67 X |
| 4,690,862 | 9/1987 | Hoffmann | 264/46.1 X |

FOREIGN PATENT DOCUMENTS 1578528 11/1980 United Kingdom .

*Primary Examiner*—Philip Anderson
*Attorney, Agent, or Firm*—Nixon & Vanderhye

[57] ABSTRACT

A stairtread facing consists essentially of a strip of friction material and a location member therefor. The strip of friction material is a co-extrusion with at least a part of the location member which rests on a stair, and both friction material and location member are made of rubber or plastics material.

11 Claims, 2 Drawing Sheets

STAIRTREAD FACINGS AND A CO-EXTRUSION METHOD FOR THEIR MANUFACTURE

This invention relates to stairtread facings and in particular to a stairtread facing made by extrusion.

Stairtread facings are used to cover the nose of each step on a staircase in locations such as public buildings, industrial premises, and the like. Conventionally such facings consist of a channel member which is shaped to cover the nose of a step and strips of non-slip friction material which are generally located in suitable locating grooves in the channel member and held there by adhesive.

The channel member is conventionally an extrusion made of aluminium or thermoplastics material and the strip is a compounded friction material based on a rubber or plastics material with suitable fillers. Fitting the strips to the channel members is a labour-intensive operation.

According to the present invention a stairtread facing comprises an extruded strip of non-slip friction material and, co-extruded therewith, at least a part of a location member said part being adapted to rest on a tread on a staircase, and said location member being shaped to extend over the nose of the step and down to a riser below.

The invention also provides a method for the manufacture of a stairtread facing which comprises co-extruding at least one strip of a non-slip friction material and at least a part of a location member for said strip, said part of the location member being adapted to reset on a tread on a staircase, whereby the strip of friction material and the co-extruded part of the location member form integral parts of the whole without need of a separate step to adhere the two together.

Generally the location member is, at least in part, a relatively rigid material which may be a rubber or a plastics material, and its function is to locate and maintain in position on a step the non-slip strip of friction material, which will usually be a more flexible material.

The strip of non-slip friction material may be based on the same plastics or rubber material as the location member, or they may be of different materials. Generally the strip would be a different colour from the location member and may contain suitable fillers and friction modifiers to enhance its anti-slip properties. Suitable fillers and friction modifiers are, for example, silicaceous fillers, carbon blacks, aluminium oxide, antimony sulphide, although the range of materials which could be used for these purposes is very wide.

The criteria on which the materials of the location member and the strip are chosen are as follows:

For the non-slip strip of friction material
(i) hardness greater than 50 Shore D
(ii) does not support combustion
(iii) good wet-friction properties
(iv) minimal oil or fat absorption
(v) high abrasion resistance
(vi) compatible for co-extrusion with the material of the channel.

For the relatively rigid material in the location member of the stairtread facing
(i) high rigidity
(ii) does not support combustion
(iii) high impact resistance
(iv) minimal oil or fat absorption
(v) high abrasion resistance
(vi) compatible for co-extrusion with material of the strip A further material which may be employed is a foamed rubber or plastics material which may be a rigid structural foam to reduce product weight, or a softer foam to introduce a cushioned feel to the step.

If desired the appearance of the location member may be enhanced by further processing such as embossing, flocking, hot foil marking etc. Also a portion of the location member may be of a flexible material, eg a nose portion.

The loction member may take any suitable form, one preferred form being that of a channel memer extending beneath, and beyond each edge of, the strip of friction material, and having a groove on its upper surface in which the co-extruded strip of friction material is located.

In a particularly preferred embodiment the location member may have a detachable nose portion to extend over the edge of a step. The detachable nose portion may be an extrusion which snap fits on to a channel member for example as described in UK Pat. No. 1,578,528. In such an embodiment a channel member is co-extruded with a strip of non-slip friction material and is the part of the location member which rests on the tread of a stair. The snap-fitting nose portion is the part of the stairtread facing which extends down the riser over the nose of thestair and its being a separate snap-fit portion enables interchangeable nose portions of different profiles to be used with the same co-extrusion. Further, the nose portion may be of a more flexible material than the channel member if desired.

Figure 2:
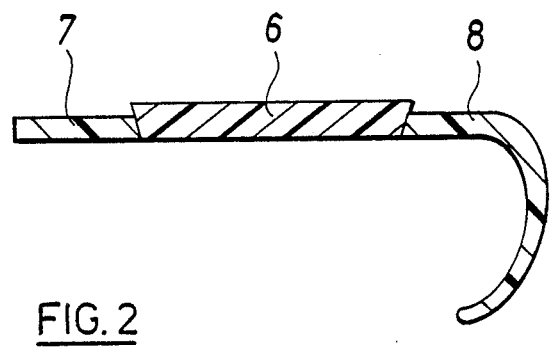
Figure 3:
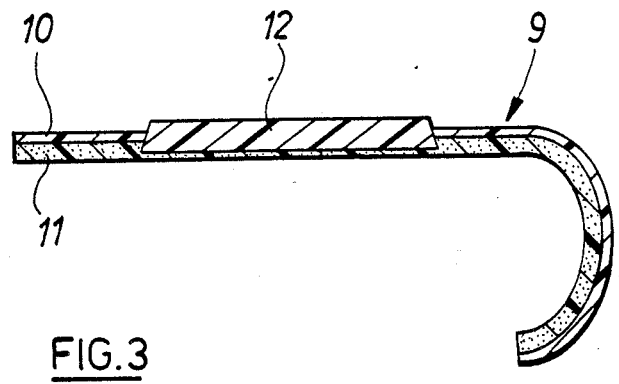
Figure 4:
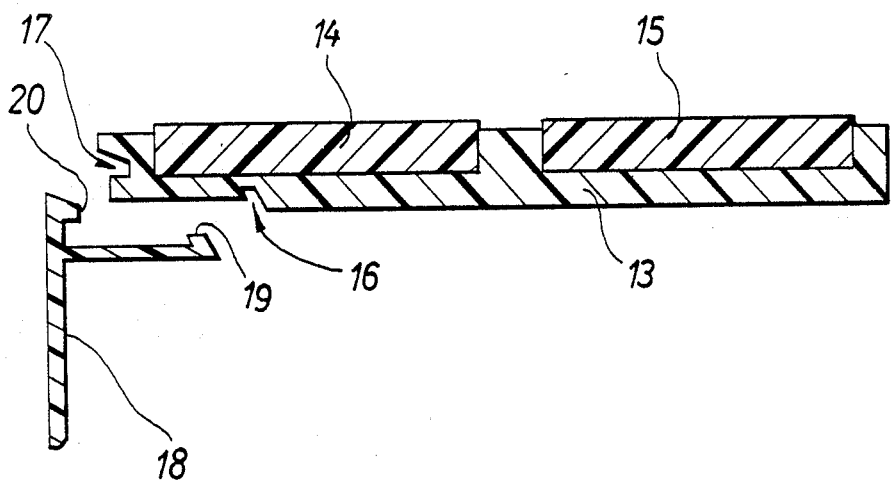

The invention will now be described in more detail by way of example only with reference to the accompanying drawings in which FIG. 1 is a cross section of a simple stairtread facing according to the invention FIG. 2 is a cross section of an alternative stairtread facing FIG. 3 is across section of a stairtread facing in which the location member is a two-layer extrusion, and FIG. 4 is a cross section of a stairtread facing having a snap-on nose portion.

The simple stairtread facing shown in FIG. 1 is composed of a location member 4 of a roughly 'L' shaped cross section which is intended to fit onto the nose of a step. A non-slip facing strip 5 is integral with or part of one surface of the member 4, having been co-extruded therewith so that the two components adhere together and cool as one.

Typically the location member 4 is made of rigid polyvinyl chloride and the strip 5 is made of plasticized polyvinyl chloride compounded with fillers and friction modifiers to provide anti-slip properties.

In the alternative stairtread facing illustrated in FIG. 2 a friction strip 6 is provided with two side pieces 7 and 8 which together form an effective location member all components 6, 7 and 8 being co-extruded together. In this case the location member is in two parts abutting each edge of the friction strip 6 which is however slightly upstanding from the surrounding area of the location member. In the alternative stairtread facing illustrated in FIG. 3 the location member is in the form of a channel member of two-layer construction, the two layers being of different materials (10 and 11). The channel member contains a groove in which a friction strip 12 is located. The whole product is a co-extrusion so that no adhesive is required to adhere together the three components.

Foamed materials may be used in the construction shown in FIG. 3, for example the layer 11 could be a rigid structural foam (to reduce the product weight) or could be a softer foam to introduce a cushioned feel to the step. Such foams are extrudable and their properties are influenced by the plastic/rubber used and by the cell structure of the foam.

In the alternative stairtread facing illustrated in FIG. 4 the location member is composed of arigid channel member 13 of plastics or rubber material, eg pvc, and a snap-fitting nose portion 18. The channel member 13 is a co-extrusion with a pair of friction material inserts 14 and 15 which are of a more flexible anti-slip compound eg based on plasticized pvc. The channel member 13 is shaped with groove 16 and 17 in order to be engaged by the separate snap-fitting nose portion 18 which has corresponding detent portions 19 and 20. The nose portion 18 may also be an extrusion of a rigid plastics material such as pvc.

In each of the embodiments diagrammatically illustrated above the stairtread facing may be attached to a stair by means of adhesive cement. In this case the underside of the location member is preferably grooved or otherwise provided with recesses to assist in keying with the cement.

Alternatively or additionally the stairtread facings may be drilled and attached by means of screws, or the like.

I claim:

1. A stairtread facing coxtruded to provide a locating member and one or more integral strips of non-slip friction material, wherein said locating member is shaped to locate said one or more strips on a stairtread, and wherein said locating member and said one or more strips have different properties.

2. A stairtread facing according to claim 1 wherein said locating member is substantially L-shaped and is adapted to extend over a nose portion of the stairtread.

3. A stairtread facing according to claim 1 in which the location member is in the form of a channel member extruded from a plastics or rubber material, said channel member including at least one groove for receiving said one or more strips of non-slip friction material.

4. A stairtread facing according to claim 1 in which the location member is in the form of two sections of plastics or rubber material extending one from each edge of one strip of non-slip friction material.

5. A stairtread facing according to any one of claims, 2 or 3 in which the non-slip friction material is a flexible plastics or rubber based anti-slip compound.

6. A stairtread facing according to claim 1 wherein said location member is provided with a detachable nose portion to extend over the edge of the stairtread.

7. A stairtread facing according to claim 5 in which the detachable nose portion comprises an extrusion which includes attachment means cooperative with mating means on the locating member for snap fit engagement with said locating member such that the detachable nose portion extends substantially perpendicularly from said locating member.

8. A stairtreaded facing according to claim 1 and further comprising a decorative surface finish applied to said location member by embossing, flocking and/or hot foil marking.

9. A stairtread facing according to claim 1 in which at least part of the plastics or rubber material is a foamed material.

10. A method of making a stairtread facing which comprises co-extruding at least one strip on non-slip friction material and at least a part of a location member for said strip, said part of the location member being adapted to rest on a tread on a staircase, whereby the co-extruded strip of friction material and said part of the location member form integral parts of the facing without need of a separate step to adhere said strip of friction material and part of the location member together.

11. A method according to claim 10 in which the said part of the location member comprises a plastics or rubber material, and said strip of friction material comprises a flexible plastics or rubber based friction compound.

* * * * *